(12) United States Patent
Huang et al.

(10) Patent No.: US 12,078,234 B2
(45) Date of Patent: Sep. 3, 2024

(54) LIGHTWEIGHT HIGH LOAD-BEARING REDUCER AND METHOD FOR GENERATING BIONIC BONE STRUCTURE OF GEAR THEREOF

(71) Applicant: Beijing Institute of Technology, Beijing (CN)

(72) Inventors: Qiang Huang, Beijing (CN); Xuxiao Fan, Beijing (CN); Richeng Huang, Beijing (CN); Gao Huang, Beijing (CN); Jingping Liao, Beijing (CN); Zhangguo Yu, Beijing (CN); Xingzhong Liu, Beijing (CN); Yuyu Zuo, Beijing (CN)

(73) Assignee: Beijing Institute of Technology, Beijing (CN)

( * ) Notice: Subject to any disclaimer, the term of this patent is extended or adjusted under 35 U.S.C. 154(b) by 394 days.

(21) Appl. No.: 17/482,183

(22) Filed: Sep. 22, 2021

(65) Prior Publication Data
US 2023/0087356 A1 Mar. 23, 2023

(51) Int. Cl.
*F16H 55/06* (2006.01)
*B22F 5/08* (2006.01)
(Continued)

(52) U.S. Cl.
CPC ............... *F16H 55/06* (2013.01); *B22F 5/08* (2013.01); *B25J 9/102* (2013.01); *B33Y 10/00* (2014.12); *B33Y 70/00* (2014.12); *B33Y 80/00* (2014.12)

(58) Field of Classification Search
CPC .......... F16H 55/06; B25J 9/102; B33Y 10/00; B33Y 70/00; B33Y 80/00; B22F 5/08
See application file for complete search history.

(56) References Cited

U.S. PATENT DOCUMENTS

| 9,700,957 | B1 * | 7/2017 | Burgess | B23K 20/16 |
| 11,415,210 | B2 * | 8/2022 | El-Wardany | F16H 55/17 |
| 11,654,486 | B2 * | 5/2023 | Deforge | C23C 26/00 464/146 |

FOREIGN PATENT DOCUMENTS

| CN | 105736676 A | 7/2016 |
| CN | 210371907 U | 4/2020 |

(Continued)

OTHER PUBLICATIONS

First Office Action issued on Apr. 1, 2021 for counterpart Chinese patent application No. 202010544226.3, along with the English translation.
(Continued)

*Primary Examiner* — William C Joyce
(74) *Attorney, Agent, or Firm* — HSML P. C.

(57) ABSTRACT

A reducer gear for robot includes an outer contour layer and a reticulated porous base layer cladded by the outer contour layer; the outer contour layer comprises a mounting surface layer, a tooth surface layer, and a connecting surface layer connected between the mounting surface layer and the tooth surface layer and forming a complete gear outer contour together with the mounting surface layer and the tooth surface layer; the mounting surface layer, the tooth surface layer and the connecting surface layer are compact structures; the reticular porous base layer is located in a cavity formed by the outer contour layer, and fiber trabeculae in a porous grid structure are provided in the reticular porous base layer.

10 Claims, 5 Drawing Sheets

(51) Int. Cl.
  *B25J 9/10*   (2006.01)
  *B33Y 10/00*  (2015.01)
  *B33Y 70/00*  (2020.01)
  *B33Y 80/00*  (2015.01)

(56) References Cited

FOREIGN PATENT DOCUMENTS

| CN | 111140639 A  |   | 5/2020 |
|----|--------------|---|--------|
| CN | 111692312    | * | 9/2020 |
| JP | 2018-132163 A |  | 8/2018 |

OTHER PUBLICATIONS

First search report issued on Mar. 25, 2021 for counterpart Chinese patent application No. 202010544226.3 along with the English translation.

* cited by examiner

LIGHTWEIGHT HIGH LOAD-BEARING REDUCER AND METHOD FOR GENERATING BIONIC BONE STRUCTURE OF GEAR THEREOF

TECHNICAL FIELD

The present disclosure relates to the field of bionic robots, and particularly to a lightweight high load-bearing reducer, and a method for generating a bionic bone structure of the gear thereof.

BACKGROUND

Currently in China and overseas, reducers for robots (especially bionic robots) should meet the requirements of three aspects in use, i.e., light weight, high bearing capacity for impact resistance, and high-precision and high-efficiency transmission. In the prior art, there are mainly three types of reducers with different structure: a harmonic reducer, which has an advantage of light weight and but is seriously deficient in the impact resistance and the efficient transmission; a cycloidal reducer (e.g., a RV reducer), which has high impact resistance and high transmission accuracy but dead weight thereof is too heavy; and a planetary gear reducer, which is excellent in the high-precision and high-efficiency transmission, superior to the cycloidal reducer while inferior to harmonic reducer in terms of the light weight, and superior to the harmonic reducer while inferior to the cycloidal reducer in terms of the high bearing capacity for impact resistance.

The reducers in the prior art, whether the harmonic reducer, the cycloidal reducer or the planetary gear reducer, lacks an optimization design of gears with light weight and high bearing capacity for impact resistance. In addition, currently in China and overseas, optimization design methods for structural members with a light weight and high load bearing capacity based on the metal 3D printing process are all aimed at the static or quasi-static load working conditions where supporting and connecting parts of optimized structural members are fixed, and generally only the support strength and support tenacity of matrix are considered in initial conditions or optimization objectives of the optimization design. However, under the periodic and dynamic alternating working conditions of a reducer gear and so on, where the contact positions and support load are constantly changed, especially under the working conditions of a reducer gear for a bionic robot joint, where there is an impact load due to contact collision, it is difficult for the existing optimization design methods for the structural members with the light weight and the high bearing capacity based on the metal 3D printing process to take into account both the internal matrix support strength and toughness and the surface contact strength and contact toughness as the initial conditions or the optimization objectives of the optimization design.

SUMMARY

Due to the above reasons, the embodiments of the present disclosure provide a lightweight high load-bearing reducer, and a method for generating bionic bone structure of a gear thereof, so as to eliminate or improve one or more defects existing in the prior art.

The technical solutions of the present disclosure are as follows:

A reducer gear for robot includes: an outer contour layer and a reticulated porous base layer cladded by the outer contour layer, the outer contour layer including a mounting surface layer, a tooth surface layer, and a connecting surface layer, which is connected between the mounting surface layer and the tooth surface layer and forms a complete gear outer contour together with the mounting surface layer and the tooth surface layer; the mounting surface layer, the tooth surface layer and the connecting surface layer are of compact structures; the reticular porous base layer is located in a cavity formed by the outer contour layer and has fiber trabeculae with porous grid structure.

In some embodiments, the thickness of each of the fiber trabeculae at every point along its axis and the spatial arrangement and connection relationship between the fiber trabeculae are determined according to a spatial stress curve generated by a load spectrum of the gear under ideal working conditions.

In some embodiments, at least part of the inter-trabecula porous cavities, which are communicated with each other and separated by the fiber trabeculae of the reticular porous base layer are filled with tough and soft material.

In some embodiments, the mounting surface layer is a supporting and fixing connection surface of the gear in reducer, and the tooth surface layer is an acting surface where the gears of the reducer meshed with each other to transmit rotational motions and torques; and thicknesses of each of the mounting surface layer and the tooth surface layer at different local points are determined according to bearing capacity and torque load of the gear under ideal working conditions.

In some embodiments, the structure of the mounting surface layer is in form of a round hole profile, a spline hole profile, a rectangular key hole profile or a regular polygonal hole profile for shaft-hole fitting; and the structure of the tooth surface layer is in form of an involute tooth profile or a cycloid tooth profile.

In some embodiments, the reticular porous base layer is formed by a reticular porous base layer structure is constructed with 3D printing in the following steps:

computing a comprehensive load spectrum of a cladded surface of the reticulated porous base layer cladded by the mounting surface layer and the tooth surface layer, according to a comprehensive load spectrum of forces and torques at different local points of the mounting surface layer and the tooth surface layer;

taking the comprehensive load spectrum of the cladded surface as a load boundary condition for an optimization design of the reticulated porous base layer, and on a premise of ensuring a force and torque transfer support strength, obtaining a spatial stress spectrum of the reticulated porous base layer in a finite element topological structure optimization method, for an optimization objective of lightweight;

performing a material allocation design for each spatial point in the reticulated porous base layer based on the spatial stress spectrum of the reticulated porous base layer, the spatial points in the reticulated porous base layer where a material is allocated with constitute fiber trabeculae, and determining thickness of each of the fiber trabeculae at every point along its axis and determining spatial arrangement and connection relationship between the fiber trabeculae based on the spatial points allocated with the material, wherein the spatial points in the reticulated porous base layer not allocated with the material constitute inter-trabecula porous cavities.

In some embodiments, the mounting surface layer, the tooth surface layer and the connecting surface layer are made of self-fluxing alloy powder or wires through a melt coating or melt deposition process, and a fine contour machining process; the reticulated porous base layer is made of self-fluxing alloy powder or wires using a 3D printing process.

In some embodiments, the mounting surface layer and the tooth surface layer are made of FeCSiB alloy powder, containing a small amount of elements with mass fractions as follows: C≈4.0%, Si≈2.0%, Cr≈1.0%, Mn≈0.7%, Mo≈0.25%, Cu≤0.2%, S≤0.03%, and P≤0.035%.

In some embodiments, the fiber trabeculae of the reticulated porous base layer are made of $Ti_6AlV_4$ alloy powder.

In some embodiments, the soft material filled in the porous cavities of the reticulated porous base layer is AlMg powder or thermosetting plastic powder, wherein the AlMg powder contains elements with mass fractions as follows: Al=93% and Mg=7.0%; the thermosetting plastic powder contains elements with mass fractions as follows: Epoxy=48%, PU=35%, and PF=17%.

The present disclosure is to provide a reducer for robot including the reducer gear for robot aforementioned.

In some embodiments, a generation method for obtaining the reducer gear for robot aforementioned is provided, the generation method including:

obtaining thicknesses of a tooth surface layer and a mounting surface layer at each position by designing based on requirements of gear alternating dynamic load working conditions as initial conditions, so as to obtain a design space of a reticulated porous base layer;

obtaining a comprehensive load spectrum of a cladded surface of the reticulated porous base layer, based on a comprehensive load of the tooth surface layer and the mounting surface;

determining initial parameters of an optimization design of the reticulated porous base layer, the initial parameters of the optimization design including: machining capability parameters of a 3D printer to be adopted; material performance parameters of the reticulated porous base layer; and a safety factor;

carrying out a 3D finite element mesh division in the design space of the reticulated porous base layer;

numbering by layers to the 3D finite element meshes divided in the design space of the reticulated porous base layer;

intra-layer 2D coordinate numbering to 3D finite element meshes on a principle axis based on the numbering by layers, and calculating the shortest transfer path from each 3D finite element mesh in a first layer containing a maximum amount of 3D finite elements to a last layer containing a minimum amount of 3D finite elements, so that the numbered 3D finite element meshes in each layer are included in all the shortest transfer paths at least once, and taking the shortest transfer paths as mesh principle axes for growth and arrangement of fiber trabeculae;

intra-layer 2D coordinate numbering to 3D finite element meshes on a non-principle axis, and obtaining a spatial stress spectrum of the design space of the reticulated porous base layer, which is composed of periodic full stress spectrums of all the 3D finite element meshes, according to the comprehensive load spectrum of the cladded surface of the reticulated porous base layer and the mesh principle axis;

growing trunk fiber trabeculae that meet requirements of support strength and tenacity of the reticulated porous base layer in the space of the reticular porous base layer, according to the spatial stress spectrum of the design space of the reticulated porous base layer;

growing supplementary branch fiber trabeculae;

obtaining a 3D printing model of the reticular porous base layer based on all the generated fiber trabeculae;

manufacturing the reticulated porous base layer through 3D printing;

manufacturing the outer contour layer using a laser melt coating or a melt deposition process, wherein the outer contour layer includes the tooth surface layer, the mounting surface layer and the connecting surface layer and dads the reticulated porous base layer.

Those skilled in the art will understand that the objectives and advantages that can be achieved by the present disclosure are not limited to those specifically described previously, and the above and other objectives that can be achieved by the present disclosure will be more clearly understood from the following detailed description.

BRIEF DESCRIPTION OF THE DRAWINGS

The drawings described here are intended to provide a further understanding of the present disclosure, and constitute a part of the present disclosure, without limiting the present disclosure. Components in the drawings are not drawn to scale, and only for illustrating the principle of the present disclosure. For the convenience of illustrating and describing some parts of the present disclosure, corresponding parts in the drawings may be enlarged, i.e., they may become larger relative to other parts in an exemplary device manufactured according to the present disclosure.

In the figures.

DETAILED DESCRIPTION

Figure 1:
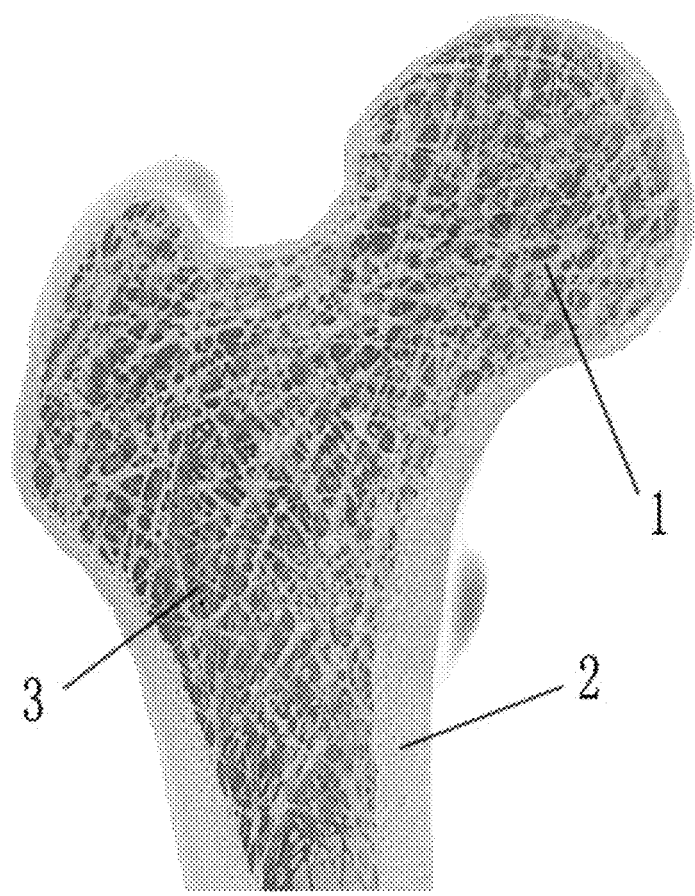
FIG. 1 is a schematic structural diagram of a skeleton section which supports and bears body of a general higher mammal in the prior art.

In order that the objectives, technical solutions and advantages of the present disclosure are clearer, the present disclosure will be further described in detail with reference to the embodiments and the drawings. Here, the exemplary embodiments of the present disclosure and the descriptions thereof are used to explain, rather than limiting, the present disclosure.

Here, it should also be noted that, in order to avoid the present disclosure from being obscured due to unnecessary details, only the structures and/or processing steps closely related to the solutions according to the present disclosure are illustrated in the drawings, while other having little to do with the present disclosure are omitted.

It should be emphasized that the term 'include (including)/comprise (comprising)' used herein refers to the presence of features, elements, steps or components, but does not exclude the presence or addition of one or more other features, elements, steps or components.

Here, it should also be noted that unless otherwise specified, the term 'connection' can mean not only a direct connection, but also an indirect connection with an intermediate.

Hereinafter, the embodiments of the present disclosure will be described with reference to the drawings. In the drawings, same reference numerals represent same or similar components, or same or similar steps.

According to the embodiments of the present disclosure, a bone structure bionic design and manufacturing are carried out on key parts of a planetary gear reducer, i.e., gears (mainly including sun gears, planetary gears, internal gear rings, etc.), for the optimization objectives of a light weight and a high bearing capacity for impact resistance, so that the gears of the reducer are as light as biological bones and have a high bearing capacity for impact resistance, thereby effectively improving the overall characteristics of the reducer in terms of the light weight and the high bearing capacity for impact resistance. The bionic robot using the reducer of the present disclosure will have greater advantages in realizing ultra-dynamic motions.

The embodiments of the present disclosure provide a reducer gear, a reducer for robots and a method for generating the reducer gear, to overcome the difficulty that the reducer cannot meet the requirements of a robot (especially a bionic robot) in three aspects, i.e., light weight, high bearing capacity for impact resistance, and high-precision and high-efficiency transmission.

Figure 2:
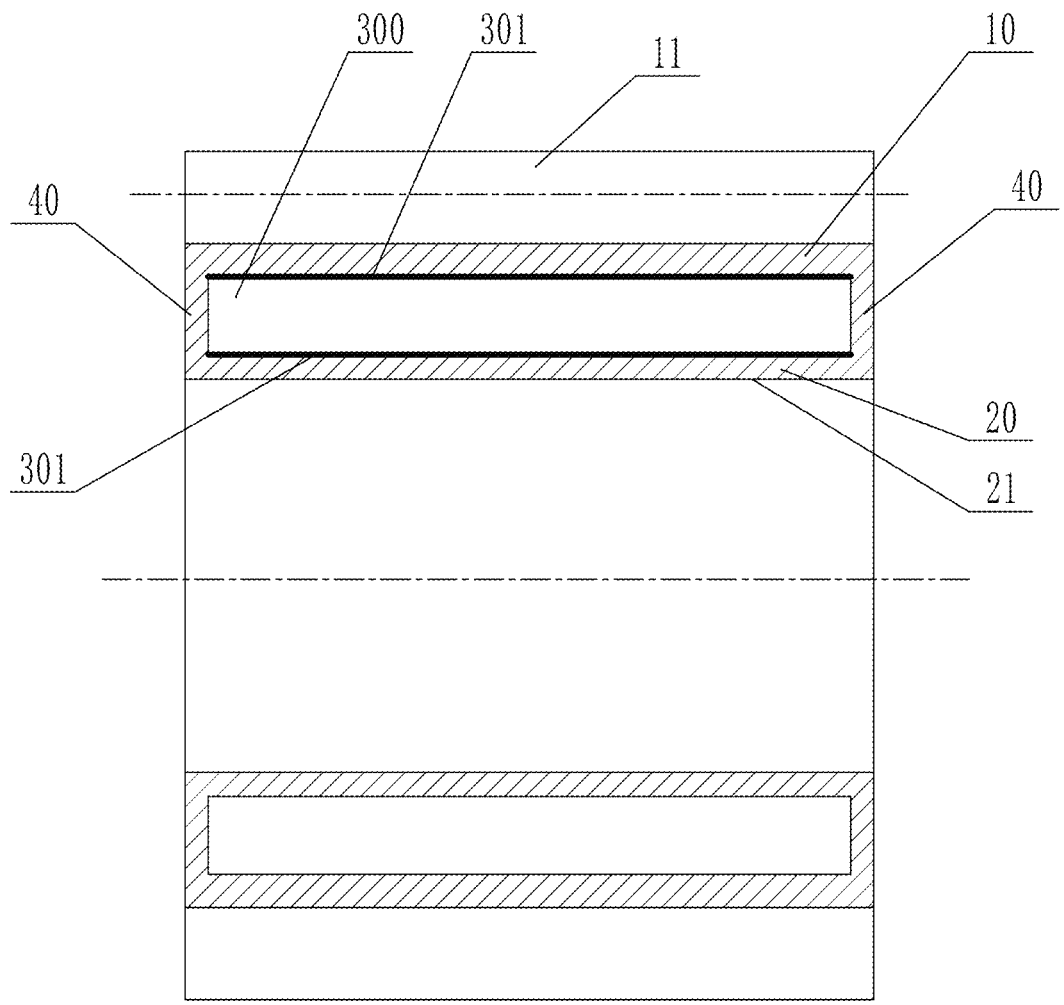
FIGS. 2 and 3 schematic views of a bone structure bionic gear according to an embodiment of the present disclosure.

According to an aspect of the present disclosure, an embodiment of the present disclosure provides a reducer gear for robot (hereinafter also referred to as a bone structure bionic gear, a bionic gear or a gear), which may be in the form of an internal gear or an external gear. As illustrated in FIG. 2, the reducer gear includes an outer contour layer and a reticulated porous base layer 30 cladded by the outer contour layer, that is, the reticulated porous base layer 30 is located in a middle of the outer contour layer.

The outer contour layer includes a mounting surface layer 20, a tooth surface layer 10, and a connecting surface layer 40, which is connected between the mounting surface layer 20 and the tooth surface layer 10 and forms a complete gear outer contour together with the mounting surface layer 20 and the tooth surface layer 10. In an embodiment, the connecting surface layer 40 is located on two sides of the reticulated porous base layer 30, and may have an annular structure to close the reticulated porous base layer 30 in combination with the mounting surface layer 20 and the tooth surface layer 10.

In this case, the mounting surface layer 20 and the tooth surface layer 10 are both of compact structures. The reticulated porous base layer 30 is located in a cavity 300 formed by the outer contour layer, and internally provided with fiber trabeculae 31 having porous grid structure. These fiber trabeculae 31 connect the mutually facing peripheral surfaces of the mounting surface layer 20 and the tooth surface layer 10, and thus realize a lightweight design of the gear on a premise of meeting the requirements of the support strength and the support toughness of the gear.

In some embodiments, a thickness of each of the fiber trabeculae 31 at every point along its axis and a spatial arrangement and connection relationship between the fiber trabeculae 31 are determined according to a spatial stress curve generated by a load spectrum of the gear under the ideal working conditions.

The bone structure bionic gear in the embodiments of the present disclosure has the advantages of considering the support strength and the support toughness of the internal matrix, the surface contact strength and contact toughness, the light weight, etc.

Figure 3:
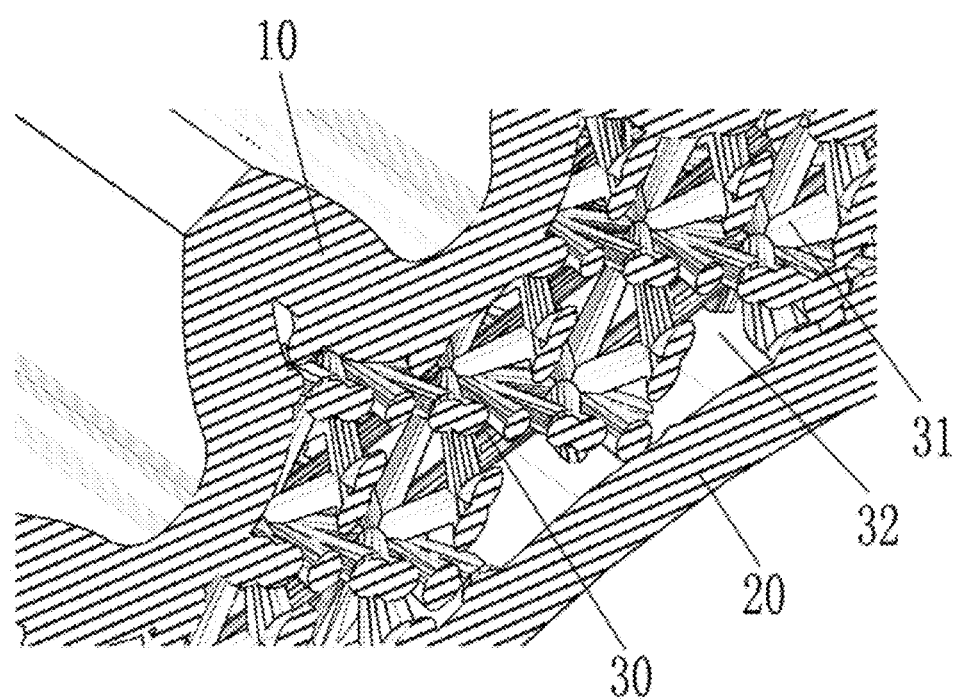

As illustrated in FIGS. 1, 2 and 3, the mounting surface layer 20 and the tooth surface layer 10 of the embodiment of the present disclosure are the outer layer structures of the bone structure bionic gear, and they simulate compact bone substances 2 and outer layer cartilages distributed on a bone peripheral surface of a higher mammal bone structure, and have excellent and high contact strength and contact toughness.

The reticulated porous base layer 30 in the embodiment of the present disclosure is an intermediate structure of the bone structure bionic gear, and is cladded by an outer layer structure composed of the mounting surface layer 20 and the tooth surface layer 10. The reticulated porous base layer 30 simulates cancellous substances 1 of the higher mammal bone structure which have non-uniform anisotropy, are cladded by the compact bone substances 2, connected by a large number of bone trabeculae to form a porous grid structure, and regularly arranged in a stress curve. The reticulated porous base layer 30 is composed of a large number of trabecular fibers 31, and a thickness of each of the fiber trabeculae 31 at every point along its axis and a spatial arrangement and connection relationship between the fiber trabeculae 31 are determined according to a spatial stress curve generated by a load spectrum of the actual working conditions of the gear. The reticulated porous base layer 30 has excellent and high support strength and support toughness.

In some embodiments, a large number of fine inter-trabecula porous cavities 32 are separated by the large number of fiber trabeculae 31 of the reticulated porous base layer 30, and at least part of each of the porous cavities are filled with a tough and soft material. In this case, the inter-trabecula porous cavities 32 may be filled with a high-toughness soft material in certain intervals according to the requirements of the working conditions. This simulates the higher mammal bone structure, wherein the marrows 3 with the functions of filling, supporting and enhancing are filled in part of the porous cavities of the cancellous substances. The soft material is preferred as a high-toughness soft material to enhance the support strength and the support toughness in the area.

In some embodiments, the mounting surface layer 20 is a supporting and fixing connection surface 21 of the reducer gear mounted in the reducer, and the tooth surface layer 10 is an acting surface 11 where the gears of the reducer meshed with each other to transmit rotational motions and torques. In a gear design, according to the actual working conditions of the gear, a thicknesses of each of the mounting surface layer 20 at different local points and the tooth surface layer 10 are determined according to bearing capacity and torque load of the gear under ideal working conditions, so as to meet the requirements of the high contact strength and the high contact toughness of the gear at different local points of the mounting surface layer 20 and the tooth surface layer 10.

In some embodiments, the structural form of the mounting surface layer 20 may be various according to the actual requirements of design and mounting, including but not limited to, a round hole profile, a spline hole profile, a rectangular key hole profile, a regular polygonal hole profile, etc. for shaft-hole fitting. The structural form of the tooth surface layer 10 may be various according to the gear meshing requirement of the planetary reducer in the actual design, including but not limited to, an in-volute tooth profile, a cycloid tooth profile, etc.

In some embodiments, the reticulated porous base layer 30 is a main medium for the internal force and torque transmission of the gear cladded by the mounting surface layer 20 and the tooth surface layer 10. The reticulated porous base layer 30 is formed by a reticular porous base layer structure printed with 3D printing and constructed in the following steps:

computing a comprehensive load spectrum of a cladded surface 301 of the reticulated porous base layer 30 cladded by the mounting surface layer 20 and the tooth surface layer 10, according to a comprehensive load spectrum of forces and torques at different local points of the mounting surface layer 20 and the tooth surface layer 10;

taking the comprehensive load spectrum of the cladded surface as a load boundary condition for an optimization design of the reticulated porous base layer 30, and on a premise of ensuring a force and torque transfer support strength, obtaining a spatial stress spectrum of the reticulated porous base layer 30 in a topological structure optimization method such as a finite element algorithm, for an optimization objective of lightweight;

performing a material allocation design for each spatial point in the reticulated porous base layer 30 based on the spatial stress spectrum of the reticulated porous base layer 30, wherein the spatial points in the reticulated porous base layer 30 allocated with a material constitute a large number of fiber trabeculae 31, and determining the thickness of each of the fiber trabeculae 31 at every point along its axis and determining the spatial arrangement and connection relationship between the fiber trabeculae 31 based on the spatial points allocated with the material, and the spatial points in the reticulated porous base layer 30 not allocated with the material constitute the inter-trabecula porous cavities 32.

In some embodiments, the inter-trabecula porous cavities 32 may be partially or completely filled with the high-toughness soft material according to the actual working conditions. Specifically, according to the actual working conditions and the spatial stress spectrum of the reticulated porous base layer 30, the soft material is allocated to the high stress points of the inter-trabecula porous cavities 32, and thus the high stress points of the inter-trabecula porous cavities 32 allocated with the soft material act as complete high-toughness filling soft material.

In some embodiments, either end surface of the bone structure bionic gear is provided with a connecting surface layer which closes and compacts the reticulated porous base layer 30, and the connecting surface layer is made of the same material as the mounting surface layer 20 and the tooth surface layer 10. In addition, the connecting surface layer may be made by the same machining process as the mounting surface layer 20 and the tooth surface layer 10, such as laser melt coating, laser melt deposition and other advanced additive manufacturing processes.

In some embodiments, an optimization design should be made for the thickness of each part of the tooth surface layer 10 and the mounting surface layer 20 according to the requirements of the alternating dynamic load working conditions as the initial conditions (which can be realized by using the finite element algorithm commonly used at present). But the thickness cannot be too large, otherwise the following disadvantages occur: 1) the weight of the gear is increased; and 2) the surface is too hard and brittle, and then is easy to fatigue and peel off. The thickness of each part of the tooth surface layer 10 and the mounting surface layer 20 also can not be too small, otherwise an enough surface contact strength cannot be provided, which will cause a surface plastic deformation and a damage during working.

The material and the machining process of the tooth surface layer 10 and the mounting surface layer 20 described in the present disclosure are the key factors for the tooth surface layer 10 and the mounting surface layer 20 to meet the performance requirements.

In some embodiments, the material selected for the tooth surface layer 10 and the mounting surface layer 20 simulates the compact bone substances with the required various physical properties, e.g., it is possible to adopt self-fluxing alloy powder or wires with dense tissues, high hardness, suitability for advanced additive manufacturing processes such as laser melt coating and laser melt deposition, and high surface contact strength and contact toughness. The selection of the specific grade or composition of the material of the tooth surface layer 10 and the mounting surface layer 20 should be made in combination with the optimization design to comprehensively weigh the performance requirements of the actual working conditions for the surface hardness, wear resistance, corrosion resistance, high temperature oxidation resistance and creep resistance of the gear, while it is necessary to consider factors such as a degree of bonding with the fiber trabeculae 31 of the reticulated porous base layer.

According to another aspect of the present disclosure, there is provided a manufacturing method of the bone structure bionic gear based on a 3D printing model of the bone structure bionic gear obtained in an optimization design method described below, including:

firstly, manufacturing the reticulated porous base layer 30 using the additive manufacturing process;

on the basis of the reticulated porous base layer 30, manufacturing the tooth surface layer and the mounting surface layer using a laser melting coating process or a melting deposition process, and cladding the surfaces of the tooth surface layer and the mounting surface layer;

finally, performing a finish machining of grinding or high-speed hobbing finishing on the tooth surface layer of the gear, and performing a finish machining of internal grinding or high-speed milling on the mounting surface layer of the gear, to obtain a bone structure bionic gear required in the design and use.

The high-speed milling here refers to the milling at high feed speed and small cutting parameter. The rotation speed of the spindle of the high-speed milling is generally 15,000 r/min to 40,000 r/min, and could be up to 100,000 r/min. A machining accuracy of the high-speed milling is generally 10-speed milling or higher, and a surface roughness Ra is generally less than 1 μm.

Self-prepared FeCSiB alloy powder (e.g., the mass fractions of a small amount of elements: C≈4.0%, Si≈2.0%, Cr≈1.0%, Mn≈0.7%, Mo≈0.25%, Cu≤0.2%, S≤0.035%, P≤0.035%) may be adopted in the use scenarios of the gear of the present disclosure, a small amount of $CaF_2$ (e.g., 3 g $CaF_2$/1 kg FeCSiB alloy, which can effectively reduce the splash of cladding and the burning loss of the elements of the alloy, increase the degree of bonding with the fiber trabeculae of the base layer, and significantly improve the performance of the cladding process) may be added as the material of the tooth surface layer and the mounting surface layer, wherein a suitable thickness of a cladding layer is 1 to 3 mm (0.3 to 0.5 mm should be reserved in the thickness of the cladding layers for a finish grinding allowance), and the laser melting cladding device has a power of 2.0 to 2.5 kW, a focal spot of 3 to 4 mm, and a scanning speed of 0.1 to 0.5 m/min. An argon gas protection is adopted throughout the process. A surface hardness of the result tooth surface layer is 52 to 65 HRC, and a surface waviness is $W_z \leq 16$ µm.

After the tooth surface layer 10 and the mounting surface layer 20 in the embodiment of the present disclosure is subjected to the additive manufacturing process such as cladding, the outline dimensional accuracy and the surface smoothness are generally difficult to directly meet the design and use requirements, and further finish machining is needed. The gear tooth surface layer 10 of the gear needs a finish machining of grinding or high-speed hobbing, and the mounting surface layer 20 of the gear needs a finish machining of internal grinding or high-speed milling, so that the accuracies of tooth profile and tooth trace, the size and the accuracy of form and position of the mounting surface, and the surface smoothness of the gear finally meet the design and use requirements.

In the present disclosure, the reticulated porous base layer 30 composed of a large number of fiber trabeculae 31, and the optimization design that the inter-trabecula porous cavities 32 may be filled with a soft material, are important parts of the optimization process which reduces the weight while ensuring the support strength and the support toughness in the optimization design method with the light weight of the gear and the high bearing capacity for impact resistance.

In some embodiments, the material selected for the fiber trabeculae 32 of the reticulated porous base layer 30 simulates the cancellous substances with the required various physical properties, e.g., it is possible to adopt self-fluxing alloy powder or wires with light weight, low specific gravity, high tensile strength, high yield strength, suitability for advanced additive manufacturing processes such as metal 3D printing, and high support strength and high support toughness of the reticulated porous structure. The selection of the specific grade or composition of the material should be made in combination with the optimization design to comprehensively weigh the performance requirements of the actual working conditions for the bearing capacity, the impact resistance and the creep resistance of various points of the gear matrix, while it is necessary to consider factors such as a degree of bonding with the cladding material of the tooth surface layer and the mounting surface layer. For example, in the use scenarios of the gear of the present disclosure, $Ti_6AlV_4$ alloy powder may be adopted as a 3D printing material of the fiber trabeculae of the reticulated porous base layer.

The inter-trabecula porous cavities 32 may be filled with the soft material, which is selected for simulating the marrows 3 between the cancellous substances, and should have excellent material properties. It is possible to adopt the metal or non-metal powder or wires with light weight, low specific gravity, moderate elastic modulus, excellent support toughness, plastic deformation resistance, excellent fire resistance, the suitability for advanced additive manufacturing processes such as multi-material 3D printing together with a metal 3D printing material, and high support strength and high support toughness of a continuous granular structure. The selection of the specific grade or composition of the material should be made in combination with the optimization design result. For example, in the use scenarios of the gear of the present disclosure, self-prepared AlMg powder (mass fractions: Al≈93%, and Mg≈7.0%) or self-prepared thermosetting plastic powder (mass fractions: Epoxy≈48%, PU≈35%, and PF≈17%) may be adopted as a soft-filling 3D printing material for multi-material 3D printing together with the metal 3D printing material.

According to still another aspect of the present disclosure, there is provided a reducer for robot, including the reducer gear for robots. Due to the bone structure bionic gear, the reducer has the advantages of considering the support strength and the support toughness, the surface contact strength and contact toughness, the light weight, etc.

Figure 4A:
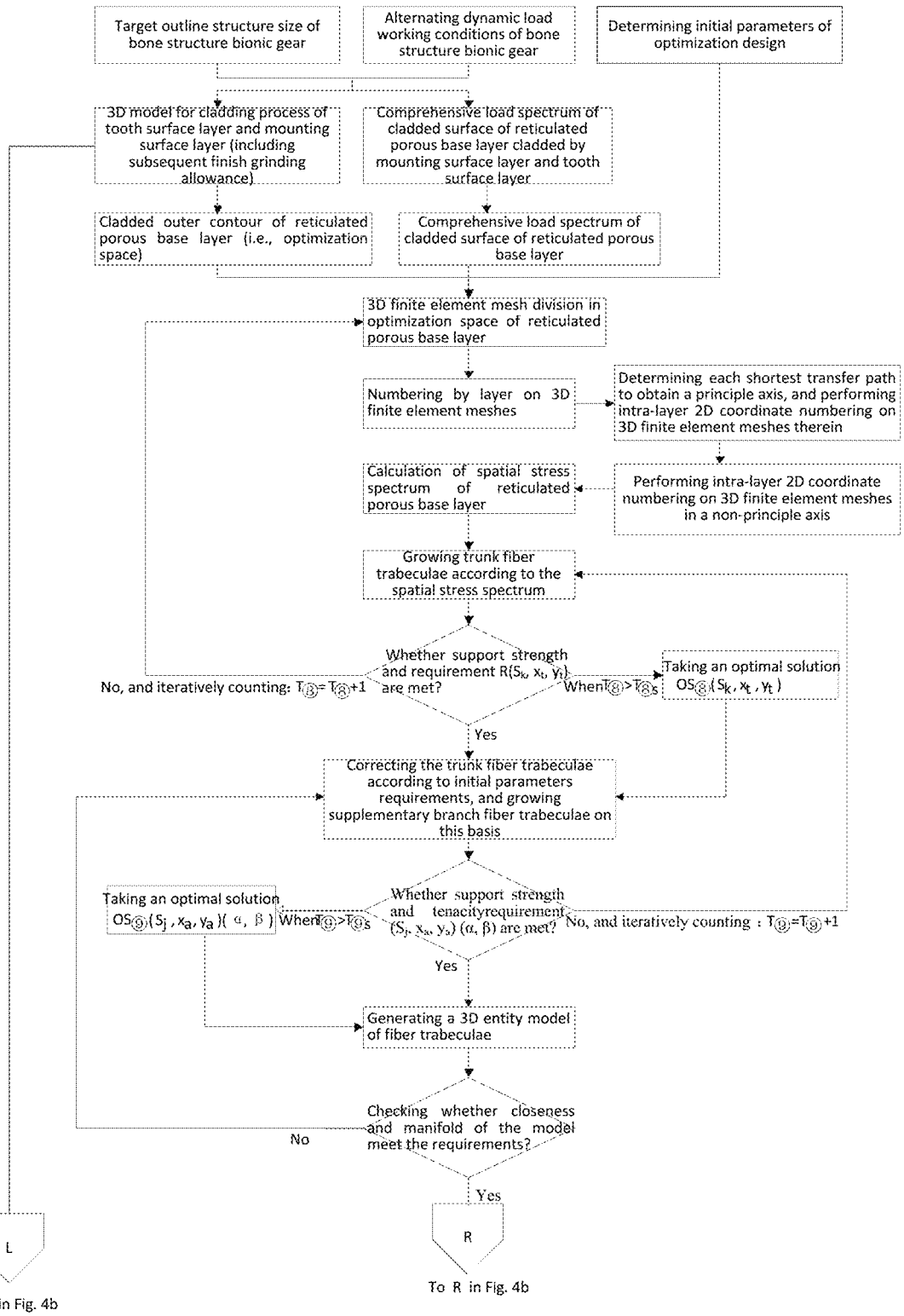
FIGS. 4a and 4b are schematic flow charts of an optimization design method of a bone structure bionic gear according to an embodiment of the present disclosure.
Figure 4B:
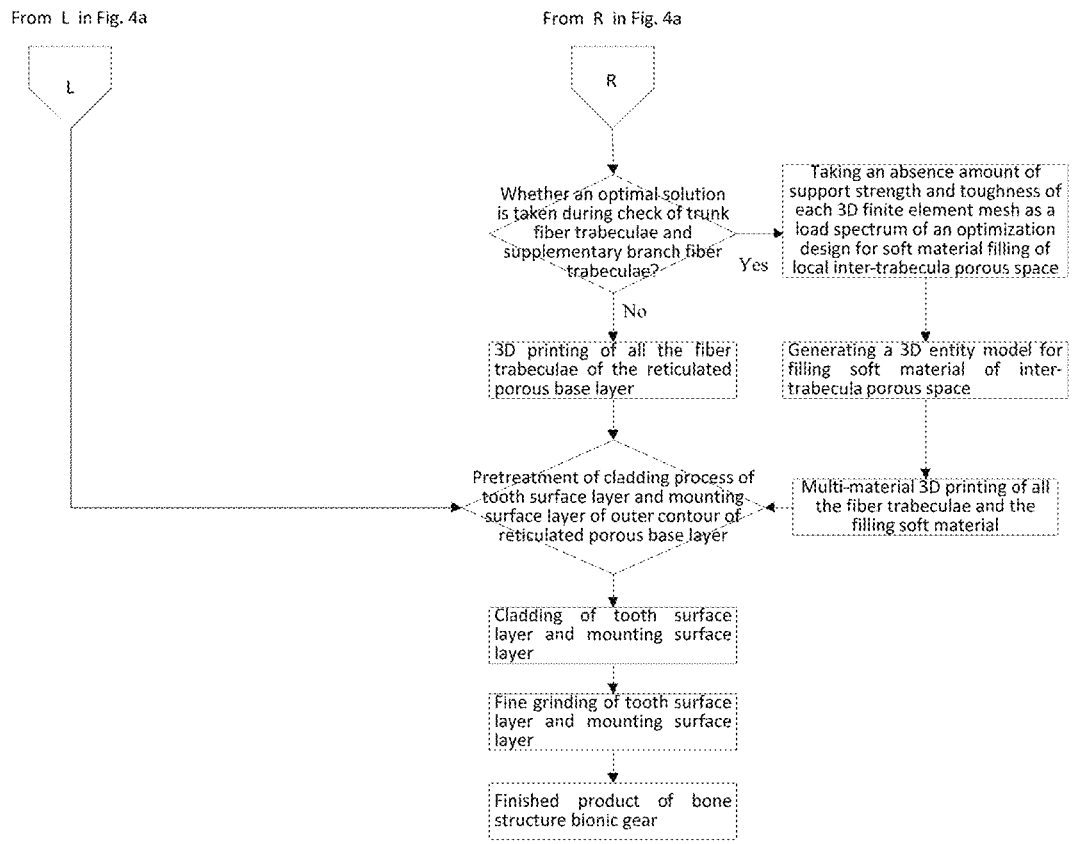

According to other aspects of the present disclosure, in order to obtain the soft space entities that may be filled in the fiber trabeculae 31 and the inter-trabeculae porous cavities 32 of the reticulated porous base layer 30 in the 3D printing process, the present disclosure further provides a generation method for obtaining the reducer gear for robots so as to make an optimization design of the reducer gear for robots as illustrated in FIGS. 4a and 4b, which specifically includes the following steps:

Step 1): after an optimization design based on requirements of alternating dynamic load working conditions as initial conditions, a thickness of each part of the tooth surface layer 10 and the mounting surface layer 20 is obtained, so as to obtain a cladded surface structure that dads the outer contour of the reticulated porous base layer 30, i.e., it is possible to obtain an optimization space (or referred to as design space) of the reticulated porous base layer 30, and the comprehensive load of each point on the cladded surface of the outer contour of the reticulated porous base layer 30 transmitted from the tooth surface layer 10 and the mounting surface layer 20, i.e. the comprehensive load spectrum of the cladded surface of the reticulated porous base layer 30. Based on the requirements of the gear alternating dynamic load working conditions as the initial conditions, the design is made to obtain the thickness of each part of the tooth surface layer and the mounting surface layer and the thickness of the reticulated porous base layer, and the comprehensive load of the tooth surface layer and the mounting surface layer may be calculated using the finite element algorithm commonly used in the prior art. The alternating dynamic load means a load having a magnitude and a direction varied periodically with time, which is applied on the gear in the working process.

Step 2): determining initial parameters required for the optimization design: the parameters related to the capabilities of the 3D printing device such as minimum entity thickness (0.2 to 0.5 mm in the present disclosure), minimum detail size (0.15 mm in the present disclosure), maximum entity inclination angle (an angle between an inclined plane and a vertical plane of the entity in a print placement state, and it is 55° in the present disclosure), etc.; the parameters related to the properties of a metal material and a soft material for 3D printing such as elastic modulus, Poisson's ratio, the cross-sectional area maximum change ($\Delta S/\Delta d$, and it is 2.3 mm in the present disclosure), etc.; and safety factors (depending on the actual working conditions of the gear, and it is 1.2 in the present disclosure).

Step 3): carrying out a 3D finite element mesh division in an optimization space of the reticulated porous base layer 30, wherein the type and order of the 3D finite element and the mesh fineness are mainly determined by estimating an initial minimum diameter of the fiber trabeculae 31.

Step 4): numbering by layers to the 3D finite element meshes divided in the optimization space of the reticulated porous base layer 30. The method of numbering by layers is as follows: in the optimization space of the reticulated porous base layer, temporarily denoting an initial layer, which is constituted by the 3D finite element meshes closely attached to the tooth surface layer, as layer $S_i1$; denoting a termination layer, which is constituted by the 3D finite element meshes closely attached to the mounting surface layer, as layer $S_t1$. Next, numbering is made by layers respectively from the initial layer and the termination layer face to face and synchronously, that is, temporarily denoting a next inner layer, which the 3D finite element meshes closely attached to the layer $S_i1$ constitutes, as a layer $S_i2$; temporarily denoting a next inner layer, which the 3D finite element meshes closely attached to the layer $S_r1$ constitutes, as a layer $S_r2$. In this way, all the 3D finite element meshes are numbered by layers oppositely until they meet completely. Assuming that there are n layers, the amounts of 3D finite element meshes respectively contained in the layer $S_i1$ and the layer $S_r1$ are compared (generally for the external gear, the amount of 3D finite element meshes in the layer $S_i1$ is larger than that in the layer $S_r1$, but it is opposite for the internal gear), and all the layers are renumbered in a descending order of the numbers. In the layers $S_i1$ and $S_r1$, a layer with a maximum amount of 3D finite element meshes is denoted as $S_1$, a layer with a minimum amount of 3D finite element meshes is denoted as $S_n$, and all the adjacent layers in the middle are successively numbered.

Step 5): performing intra-layer 2D coordinate numbering to the 3D finite element meshes on a principle axis. The method is as follows: the layer $S_1$ is taken as a basis for the intra-layer 2D coordinate numbering, and the layer $S_n$ is taken as a basis for the spatial expansion projection. The basic number 2D coordinate system in the layer $S_1$ generally takes an axial direction as a positive direction of an x-axis, and a direction of four fingers of a right hand expanded relative to the thumb in the x-axis as a positive direction of a y-axis. An origin position is determined to ensure that the 2D coordinate numbers ($S_1$, x, y) of adjacent 3D finite element meshes in the layer $S_1$ are all adjacent positive integers (i.e., x, y ∈ $Z^{\rightarrow}$), and the 2D coordinate numbers of the adjacent 3D finite element meshes in the remaining layers are all positive integers since the amount of 3D finite element meshes in each layer is varying, but they may not be adjacent to each other. The projection is made in a space from the layer $S_1$ to the layer $S_n$, and the intra-layer 2D coordinate numbering is performed on the 3D finite element meshes from the layer $S_1$ to the layer $S_n$ one by one. Firstly, a shortest transfer path to the layer $S_n$ may be calculated for each 3D finite element mesh of the layer $S_1$ (i.e., a transfer path passing through a least amount of adjacent 3D finite element meshes to reach a certain 3D finite element mesh of the layer $S_n$ can be found for each 3D finite element mesh of the layer $S_1$). The number of times that all the 3D finite element meshes of each layer have been passed through by the transfer path and the 3D finite element meshes that have been passed through by the transfer path each time at an upper source end are counted and recorded, except for the layer $S_1$. For a 3D finite element mesh numbered in a predetermined sequence to a layer $S_k$ (1<k≤n), the number of times of being passed through by the transfer path and the 3D finite element meshes at the source end are as follows: the $a_1$ time originates from a 3D finite element mesh ($S_{k-1}$, $x_{a1}$, $y_{a1}$), the $a_2$ time originates from a 3D finite element meshes ($S_{k-1}$, $x_{a2}$, $y_{a2}$), . . . , and the $a_m$ time originates from a 3D finite element mesh ($S_{k-1}$, $x_{am}$, $y_{am}$). Regarding a 3D finite element mesh ($S_k$, $x_t$, $y_t$), $x_t$ is a number closest to $$\frac{\sum_{p=1}^{\infty} a_p x_{ap}}{\sum_{p=1}^{\infty} a_p}$$

among the positive integers $x_{a1}$, $x_{a2}$, . . . , $x_{am}$, and $y_t$ is a number closest $$\frac{\sum_{p=1}^{\infty} a_p x_{ap}}{\sum_{p=1}^{\infty} a_p}$$

among the positive integers $y_{a1}$, $y_{a2}$, . . . , $y_{am}$. At this time, all the numbered 3D finite element meshes of each layer are included in each shortest transfer path from each 3D finite element mesh of the layer $S_1$ to the layer $S_n$ at least once, and these shortest transfer paths are the mesh principle axes for the growth and arrangement of the fiber trabeculae of the reticulated porous base layer.

Step 6): performing intra-layer 2D coordinate numbering to the 3D finite element meshes in the non-principle axes. The method is as follows: in each layer, the 3D finite element meshes that have been numbered on the principle axis are taken as local origins on the layer, and the positive direction of the x-axis and the positive direction of the y-axis determined by the intra-layer 2D coordinates are taken as positive numbering directions; in a same layer, each local origin is taken as a concentric center for synchronous diffusion, and numbering is performed in this sequence until all the unnumbered 3D finite element meshes on all the non-principle axes in each layer are numbered. A 3D finite element mesh numbered as ($S_k$, $x_a$, $y_a$) (α, β) on the non-principle axis of the layer $S_k$ indicates that it has a distance α to a projection of the 3D finite element mesh ($S_k$, $x_a$, $y_a$) in the principle axis of the layer on the x-axis of the intra-layer 2D coordinates, and a distance β to a projection of the 3D finite element mesh ($S_k$, $x_a$, $y_a$) in the y-axis of the intra-layer 2D coordinates (α and β ∈ Z, and α and β#0). In addition, among the distances between the 3D finite element meshes in the non-principle axes in ($S_k$, $x_a$, $y_a$) (α, β) and the 3D finite element meshes in all the principle axes of the layer, the distance to the 3D finite element mesh in the principle axes of ($S_k$, $x_a$, $y_a$) is the shortest, which is |α|+|β| and indicates that two 3D finite element meshes can reach each other by passing through |α|+|β| adjacent 3D finite element meshes.

Step 7): calculating a spatial stress spectrum for the reticulated porous base layer. The method is as follows: firstly, a periodic segment of a comprehensive load spectrum of a cladded surface of the reticulated porous base layer is divided into an external load spectrum on the layer $S_i1$ and a support load spectrum on the layer $S_r1$, with equal average amplitudes and opposite phases. Next, the external load spectrum is decomposed for each 3D finite element mesh on the layer $S_i1$, and the support load spectrum is decomposed for each 3D finite element mesh on the layer $S_r1$. Next, according to the mesh principle axis generated in step 5), a transfer function is determined for each single-mesh transfer path. Next, a periodic single-path stress spectrum of each 3D finite element mesh in each single-mesh transfer path within one period is calculated according to the numbering sequence of each 3D finite element mesh on the layer $S_1$. If a plurality of transfer paths pass through a same 3D finite element mesh, the periodic single-path stress spectrum of each transfer path at the 3D finite element mesh should be superimposed, and finally a periodic full stress spectrum of the 3D finite element mesh is obtained. The periodic full stress spectrums of all the 3D finite element meshes constitute a spatial stress curve of the reticulated porous base layer, i.e., a spatial stress spectrum thereof.

Step 8): growing trunk fiber trabeculae in the reticular porous base layer 30. The method is as follows: based on the spatial stress spectrum of the reticulated porous base layer, the 3D finite element meshes in the surrounding non-principle axes are carried from the near to the distant in each layer by taking the 3D finite element meshes in the principle axes as centers, according to a principle of least carrying, and the amount of the 3D finite element meshes carried in each direction is determined by the periodic full stress spectrum of the 3D finite element meshes $(S_k, x_t, y_t)$ in combination with initial parameters such as an elastic modulus and a Poisson's ratio, which are related to the printing material properties, so as to meet the support strength and tenacity requirement $R(S_k, x_t, y_t)$ of the reticulated porous base layer. If $R(S_k, x_t, y_t)$ cannot be met, the method returns to step 3) to adjust the initial parameters, divides the 3D finite element meshes again, and record an amount of return iterations $T_{⑧}$. When $T_{⑧}>$ set amount $T_{⑧s}$, and it is estimated and judged that the support strength can be supplemented by filling the cavities with a soft material to meet the requirements, the method does not return to step 3) for iteration, takes the optimal solution $OS_{⑧}(S_k, x_t, y_t)$ for the support strength and toughness requirements in each iteration, and enters step 9).

Generally, as a stress amplitude of a periodic full stress spectrum of a 3D finite element mesh in a principle axis increases in a direction, more 3D finite element meshes in a non-principle axis are carried in this direction. If a stress amplitude of a periodic full stress spectrum of a 3D finite element mesh in a principle axis is zero in each direction, no trunk fiber trabecula will grow in the transfer path passing through the 3D finite element mesh (in this case, the initial meshed on the layer Sit of the transfer path of the 3D finite element mesh does not bear an external load).

Step 9): correcting the trunk fiber trabeculae, and growing supplementary branch fiber trabeculae on this basis. The trunk fiber trabeculae generated in the calculation in step 8) usually do not meet the requirements of a minimum entity thickness, a minimum detail size, a maximum entity inclination angle, a maximum variation of cross-sectional area, a safety factor, etc., which are required by the initial parameters of the optimization design. Thus, it is necessary to correct, by increasing or decreasing, the carried 3D finite element meshes in the non-principle axes for each trunk fiber trabecula layer by layer in all directions. If a trunk fiber trabecula locally cannot meet the shape requirement and the support strength and toughness requirement at the same time only by correction, it is necessary to grow supplementary branch fiber trabeculae at the 3D finite element meshes $(S_j, x_a, y_a) (\alpha, \beta)$ locally near the trunk fiber trabeculae, so as to meet the shape requirement and the support strength and toughness requirement $R(S_j, x_a, y_a) (\alpha, \beta)$ of the locally related fiber trabeculae at the same time.

If step 8) is entered by lowering the requirement in the form of an optimal solution $OS_{⑧}(S_k, x_t, y_t)$, this step only needs to meet the shape requirement of the locally related fiber trabecula and the requirement of the optimal solution $OS_{⑧}(S_k, x_t, y_t)$ at the same time. The supplementary branch fiber trabeculae should have a shortest supplementary path and meet the requirement of initial parameters. If the correction of trunk fiber trabeculae and the growth of supplementary branch fiber trabeculae cannot meet the shape requirement, the support strength and toughness requirement $R(S_k, x_t, y_t)$ or the optimal solution $OS_{⑧}(S_k, x_t, y_t)$, and the requirement $R(S_j, x_a, y_a) (\alpha, \beta)$, the method returns to step 8) to adjust the initial parameters, grow the trunk fiber trabeculae again, and record an amount of return iterations $T_{⑨}$. When $T_{⑨}>$ set amount $T_{⑨s}$, and it is estimated and judged that the support strength can be supplemented by filling the cavities with a soft material subsequently to meet the requirements, the method does not return to step 8) for iteration, takes the optimal solution for the support strength and toughness requirements in each iteration, and enters step 10).

Step 10): generating 3D entities of all the fiber trabeculae, and checking closeness and manifold of the 3D printing model. If the 3D entity model formed by all the fiber trabeculae cannot meet the closeness and manifold required by the 3D printing process, the method returns to step 9) for correction.

Step 11): if in either or both of steps 8) and 9), the requirement is lowered with the optimal solution to enter the next step, it is necessary to fill the inter-trabecula porous cavities with a soft material to supplement the support strength and toughness of the reticulated porous base layer. The specific method is as follows: if $OS_{⑧}(S_k, x_t, y_t)$ is existed, $R(S_k, x_t, y_t) - OS_{⑧}(S_k, x_t, y_t)$ is taken as the load spectrum of optimization design of soft material filling for the inter-trabecula porous cavities locally near the 3D finite element mesh $(S_k, x_t, y_t)$, the 3D finite element meshes in the nearby inter-trabecula porous cavities are carried in the same way as in steps 8) and 9), to form a soft-filled entity 3D model. If $OS_{⑨}(S_j, x_a, y_a) (\alpha, \beta)$ is existed, a soft-filled entity 3D model is formed in the same way.

Step 12): completing the specific optimization design of the soft material entities that may be filled in the fiber trabeculae and the inter-trabecula porous cavities of the reticulated porous base layer, and obtaining a 3D printable model of all fiber trabeculae entities, or a multi-material 3D printable model of the inter-trabecula porous cavities filled with a soft material.

The above optimization process adopts the shortest transfer path and the principle of least carrying, thereby ensuring that the weight is lightest under the premise that all the fiber trabeculae 31 and the soft material that might be filled meet the support strength and the support toughness of the reticulated porous base layer 30.

Finally, a 3D printing model of the reticulated porous base layer is obtained based on all the generated fiber trabeculae, and the reticulated porous base layer is manufactured by 3D printing, and an outer contour layer is manufactured by laser melt coating or laser melt deposition, wherein the outer contour layer includes a tooth surface layer, an mounting surface layer and a connection surface layer and dads the reticulated porous base layer.

With the gear design and manufacturing method of the present disclosure, the minimum modulus of the gear that can be machined is 3 to 4 times of a minimum machining thickness that can be achieved by the machining process of the fiber trabeculae of the reticular porous base layer. The fiber trabeculae of the reticulated porous base layer is generally machined by metal 3D printer having a minimum machining thickness of 0.2 mm at present, so the minimum modulus of the gear that can be machined in the process of the present disclosure is 0.6 to 0.8 mm.

The reducer gear, the reducer for robots and the method for generating the reducer gear in the present disclosure are also applicable to other structural members, such as bevel gears, pulleys, sprockets and transmission shafts.

The reducer gear and the reducer for robots in the embodiments of the present disclosure overcome the difficulty that the reducer cannot meet the requirements of a robot (especially a bionic robot) in three aspects, i.e., a light weight, a high bearing capacity for impact resistance, and a high-precision and high-efficiency transmission, and provide greater advantages for a robot to realize super dynamic motions in terms of the key transmission components, and especially the reducer.

The lightweight high load bearing reducer and the method for generating bionic bone structure of the gear thereof according to the embodiments of the present disclosure, at least have the following advantageous:

The reducer gear in the embodiments of the present disclosure overcome the difficulty that the reducer cannot meet the requirements of a robot (especially a bionic robot) in three aspects, light weight, high load bearing capacity for impact resistance, and high-precision and high-efficiency transmission, and it provides greater advantages for a robot to realize super dynamic motions in terms of the key transmission components, and especially the reducer.

Additional advantages, objectives, and features of the present disclosure will be set forth in part in the following description, and in part will become apparent to those of ordinary skill in the art upon study of the following description, or can be learned by practicing the present disclosure. The objectives and other advantages of the present disclosure can be realized and obtained with the structures particularly pointed out in the written description and claims thereof and the drawings.

In the present disclosure, features described and/or illustrated for one embodiment may be used in a same or similar way in one or more other embodiments, and/or may be combined with or take place of features of other embodiments.

Those described above are merely preferred embodiments of the present disclosure, rather than limitations to the present disclosure. For those skilled in the art, various modifications and variations can be made to the embodiments of the present disclosure. Any modification, equivalent substitution, improvement, etc. made within the spirit and principle of the present disclosure should fall within the protection scope of the present disclosure.

The invention claimed is:

1. A reducer gear for robot, comprising: an outer contour layer and a reticulated porous base layer cladded by said outer contour layer, said outer contour layer including a mounting surface layer, a tooth surface layer, and a connecting surface layer, which is connected between the mounting surface layer and the tooth surface layer and forms a complete gear outer contour together with the mounting surface layer and the tooth surface layer;

the reticular porous base layer is located in a cavity formed by the outer contour layer and has fiber trabeculae with porous grid structure;

the reticular porous base layer is formed by a reticular porous base layer structure printed with 3D printing and constructed in the following steps:

computing a comprehensive load spectrum of a cladded surface of the reticulated porous base layer cladded by the mounting surface layer and the tooth surface layer, according to a comprehensive load spectrum of forces and torques at different local points of the mounting surface layer and the tooth surface layer;

taking the comprehensive load spectrum of the cladded surface as a load boundary condition for an optimization design of the reticulated porous base layer, and on a premise of ensuring a force and torque transfer support strength, obtaining a spatial stress spectrum of the reticulated porous base layer in a finite element topological structure optimization method, for an optimization objective of lightweight;

performing a material allocation design for each spatial point in the reticulated porous base layer based on the spatial stress spectrum of the reticulated porous base layer, the spatial points in the reticulated porous base layer where a material is allocated with constitute fiber trabeculae, and determining a thickness of each of the fiber trabeculae at every point along its axis and determining a spatial arrangement and connection relationship between the fiber trabeculae based on the spatial points allocated with the material, and the spatial points in the reticulated porous base layer not allocated with the material constitute inter-trabecula porous cavities.

2. The reducer gear according to claim 1, wherein the thickness of each of the fiber trabeculae at every point along its axis and the spatial arrangement and connection relationship between the fiber trabeculae are determined according to a spatial stress curve generated by a load spectrum of the gear.

3. The reducer gear according to claim 1, wherein
at least part of the inter-trabecula porous cavities, which are communicated with each other and separated by the fiber trabeculae of the reticular porous base layer, are filled with a filling material.

4. The reducer gear according to claim 3, wherein the mounting surface layer is a supporting and fixing connection surface of the reducer gear mounted in a reducer, and the tooth surface layer is an acting surface where the reducer gears of the reducer meshed with each other to transmit rotational motions and torques; and thicknesses of each of the mounting surface layer and the tooth surface layer at different local points are determined according to bearing capacity and torque load of the gear.

5. The reducer gear according to claim 3, wherein the structure of the mounting surface layer is in form of a round hole profile, a spline hole profile, a rectangular key hole profile or a regular polygonal hole profile for shaft-hole fitting; and the structure of the tooth surface layer is in form of an involute tooth profile or a cycloid tooth profile.

6. The reducer gear according to claim 3, wherein
the mounting surface layer, the tooth surface layer and the connecting surface layer are made of self-fluxing alloy powder or wires through a melt coating or melt deposition process, and a fine contour machining process;
the reticulated porous base layer is made of self-fluxing alloy powder or wires using a 3D printing process.

7. The reducer gear according to claim 6, wherein the mounting surface layer and the tooth surface layer are made of FeCSiB alloy powder containing elements with mass fractions as follows: C≈4.0%, Si≈2.0%, Cr≈1.0%, Mn≈0.7%, Mo≈0.25%, Cu≤0.2%, S≤0.035%, and P≤0.035%;
the fiber trabeculae of the reticulated porous base layer are made of $Ti_6AlV_4$ alloy powder.

8. The reducer gear according to claim 3, wherein
the filling material filled in the porous cavities of the reticulated porous base layer is AlMg powder or thermosetting plastic powder, wherein the AlMg powder contains elements with mass fractions as follows: Al=93% and Mg=7.0%; the thermosetting plastic powder contains elements with mass fractions as follows: Epoxy=48%, PU=35%, and PF=17%.

9. A reducer for robot, comprising the reducer gear for robot according to claim 1.

10. A generation method for obtaining the reducer gear for robot according to claim 1, comprising:

obtaining thicknesses of a tooth surface layer and a mounting surface layer at each position by designing based on requirements of gear alternating dynamic load working conditions as initial conditions, so as to obtain a design space of a reticulated porous base layer;

determining initial parameters of an optimization design of the reticulated porous base layer, the initial parameters of the optimization design including: machining capability parameters of a 3D printer to be adopted, material performance parameters of the reticulated porous base layer, and a safety factor;

carrying out a 3D finite element mesh division in the design space of the reticulated porous base layer;

numbering by layers to the 3D finite element meshes divided in the design space of the reticulated porous base layer;

intra-layer 2D coordinate numbering to 3D finite element meshes on a principle axis based on the numbering by layers, and calculating the shortest transfer path from each 3D finite element mesh in a first layer containing a maximum amount of 3D finite elements to a last layer containing a minimum amount of 3D finite elements, so that the numbered 3D finite element meshes in each layer are included in all the shortest transfer paths at least once, and taking the shortest transfer paths as mesh principle axes for growth and arrangement of fiber trabeculae;

intra-layer 2D coordinate numbering to 3D finite element meshes on a non-principle axis, and obtaining a spatial stress spectrum of the design space of the reticulated porous base layer, which is composed of periodic full stress spectrums of all the 3D finite element meshes, according to the comprehensive load spectrum of the cladded surface of the reticulated porous base layer and the mesh principle axis;

growing trunk fiber trabeculae that meet requirements of support strength and tenacity of the reticulated porous base layer in the space of the reticular porous base layer, according to the spatial stress spectrum of the design space of the reticulated porous base layer;

growing supplementary branch fiber trabeculae;

obtaining a 3D printing model of the reticular porous base layer based on all the generated fiber trabeculae;

manufacturing the reticulated porous base layer through 3D printing;

manufacturing the outer contour layer using a laser melt coating or a melt deposition process, wherein the outer contour layer includes the tooth surface layer, the mounting surface layer and the connecting surface layer and clads the reticulated porous base layer.

* * * * *